(12) United States Patent
Barkan

(10) Patent No.: US 7,264,162 B2
(45) Date of Patent: Sep. 4, 2007

(54) OPTICAL ADJUSTMENT OF WORKING RANGE AND BEAM SPOT SIZE IN ELECTRO-OPTICAL READERS

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 350 days.

(21) Appl. No.: 10/849,084

(22) Filed: May 19, 2004

(65) Prior Publication Data

US 2005/0199720 A1 Sep. 15, 2005

Related U.S. Application Data

(63) Continuation-in-part of application No. 10/798,498, filed on Mar. 11, 2004, now Pat. No. 7,201,318.

(51) Int. Cl.
*G06K 7/10* (2006.01)
*G06K 7/14* (2006.01)

(52) U.S. Cl. ................................. 235/454; 235/455

(58) Field of Classification Search ................ 235/454
See application file for complete search history.

(56) References Cited

U.S. PATENT DOCUMENTS

| | | | | |
|---|---|---|---|---|
| 4,877,949 | A * | 10/1989 | Danielson et al. | 235/462.21 |
| 5,071,229 | A * | 12/1991 | Oaki et al. | 349/200 |
| 5,150,234 | A * | 9/1992 | Takahashi et al. | 349/1 |
| 6,166,784 | A * | 12/2000 | Murata et al. | 349/1 |
| 6,250,550 | B1 * | 6/2001 | Winarski et al. | 235/383 |
| 6,288,767 | B1 * | 9/2001 | Murata et al. | 349/200 |
| 6,347,742 | B2 * | 2/2002 | Winarski et al. | 235/462.35 |
| 6,369,954 | B1 * | 4/2002 | Berge et al. | 359/666 |
| 6,449,081 | B1 * | 9/2002 | Onuki et al. | 359/245 |
| 6,702,483 | B2 * | 3/2004 | Tsuboi et al. | 396/449 |
| 6,806,988 | B2 * | 10/2004 | Onuki et al. | 359/253 |
| 2005/0002113 | A1 * | 1/2005 | Berge | 359/666 |

* cited by examiner

*Primary Examiner*—Uyen-Chau N Le
(74) *Attorney, Agent, or Firm*—Kirschstein, et al.

(57) ABSTRACT

Working range and laser beam cross-section are adjusted in an electro-optical reader for reading indicia by applying control voltages to a pair of variable lenses to change the shape of a liquid therein. An aperture stop maintains a constant beam cross-section as an input to one of the lenses.

16 Claims, 4 Drawing Sheets

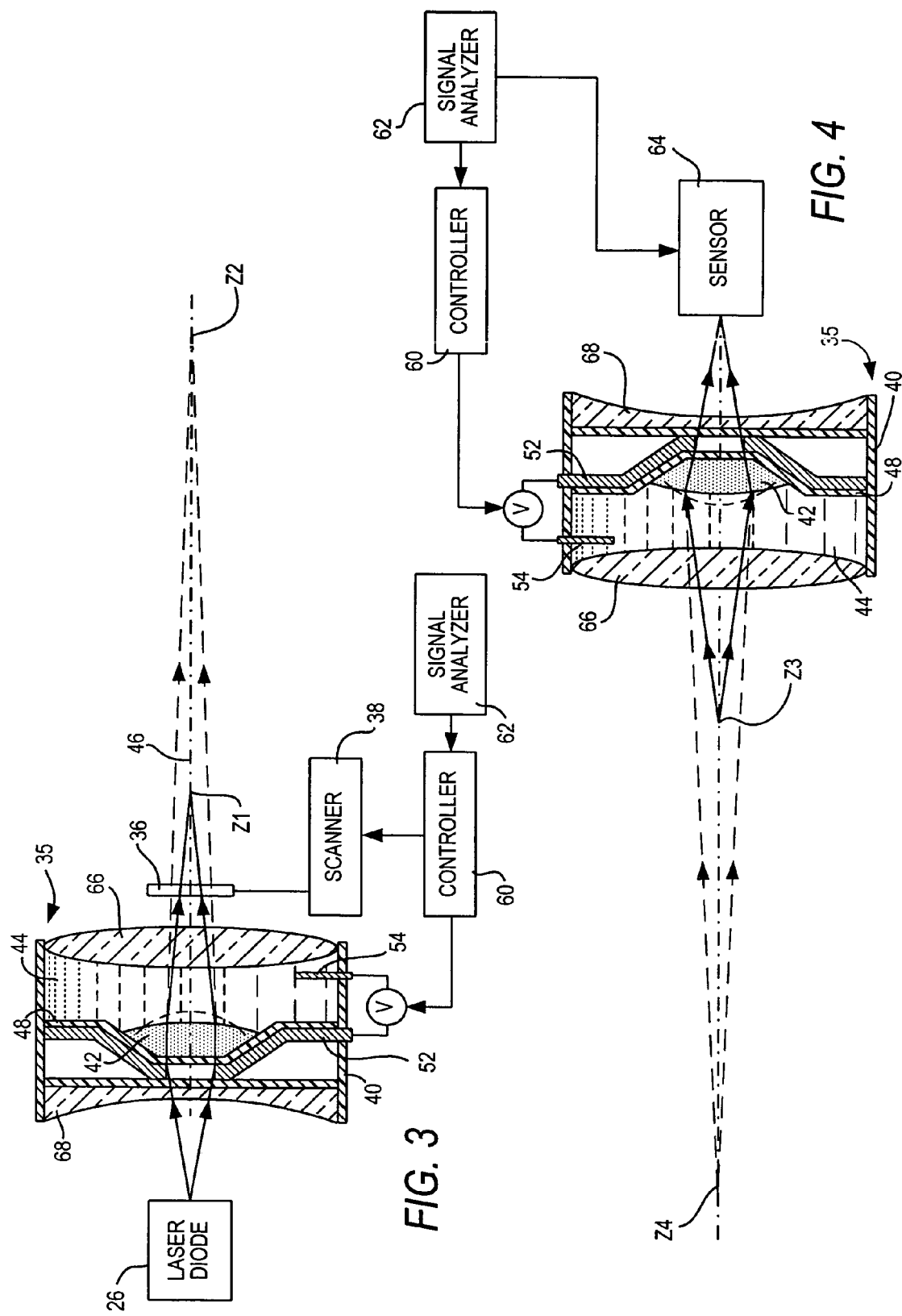

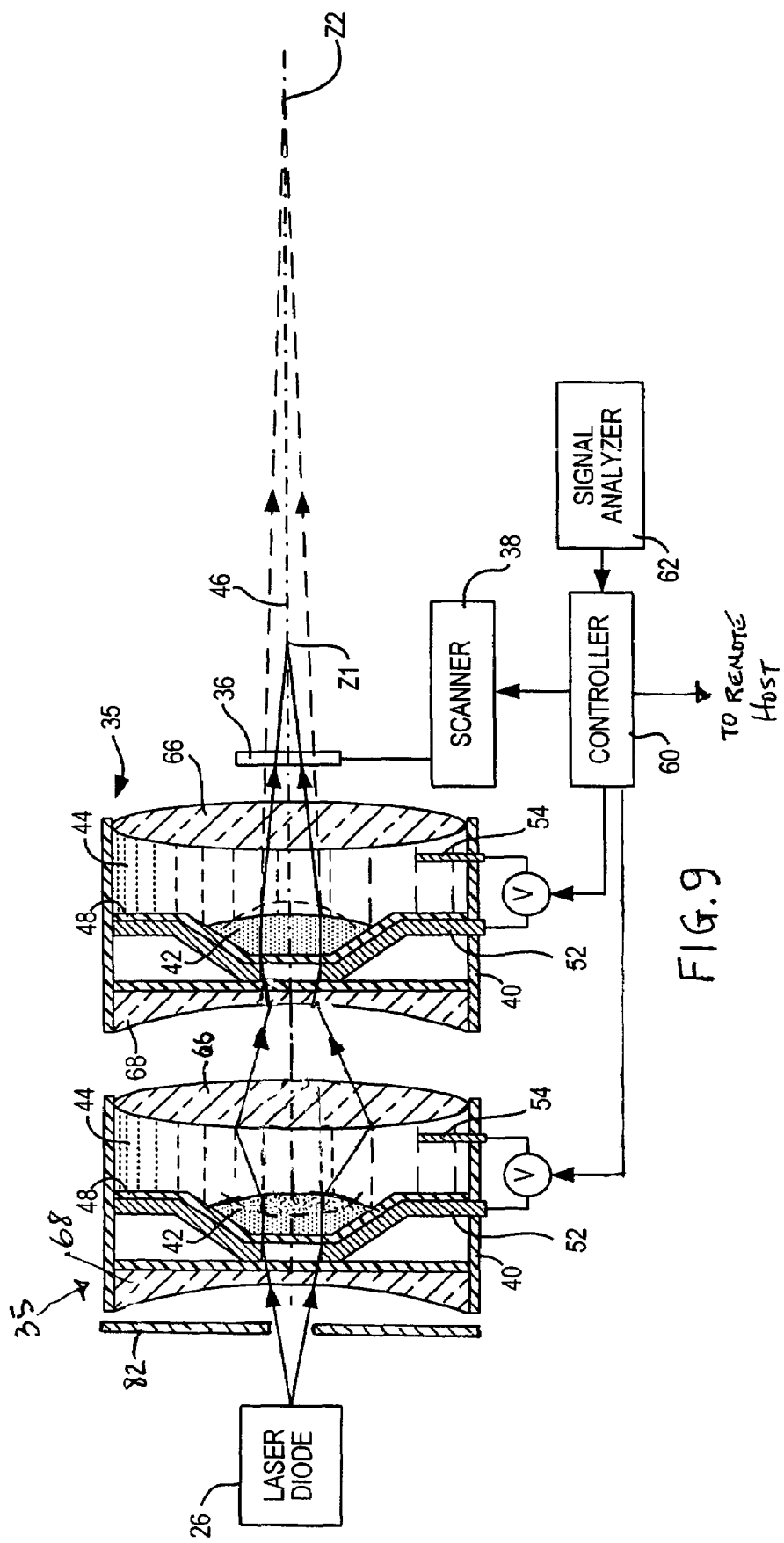

OPTICAL ADJUSTMENT OF WORKING RANGE AND BEAM SPOT SIZE IN ELECTRO-OPTICAL READERS

CROSS-REFERENCE TO RELATED APPLICATION

This application is a continuation-in-part of U.S. patent application Ser. No. 10/798,498, filed Mar. 11, 2004 now U.S. Pat. No. 7,201,318, and commonly assigned therewith.

BACKGROUND OF THE INVENTION

1. Field of the Invention

The present invention generally relates to electro-optical systems for reading indicia, for example, bar code symbols, having parts with different light reflectivities and, in particular, to an arrangement for, and a method of, adjusting the working range and/or the laser beam cross-section for increased performance in the system.

2. Description of the Related Art

Various electro-optical readers and systems have previously been developed for reading bar code symbols appearing on a label, or on a surface of a target. The bar code symbol itself is a coded pattern of indicia. Generally, the readers electro-optically transform graphic indicia of the symbols into electrical signals which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

The specific arrangement of symbol elements, e.g., bars and spaces, in a symbol defines the characters represented according to a set of rules and definitions specified by a code or symbology. The relative size of the bars and spaces is determined by the type of code used, as is the actual size of the bars and spaces.

To encode a desired sequence of characters, a collection of element arrangements is concatenated to form the complete symbol, with each character being represented by its own corresponding group of elements. In some symbologies, a unique "start" and "stop" character is used to indicate where the symbol begins and ends. A number of different bar code symbologies presently exists. The symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of elements vertically instead of extending elements horizontally. That is, there are several rows of bar and space patterns, instead of one long row. The structure of Code 49 is described in U.S. Pat. No. 4,794,239. Another two-dimensional code structure known as PDF417 is described in U.S. Pat. No. 5,304,786.

Electro-optical readers have been disclosed, for example, in U.S. Pat. No. 4,251,798; U.S. Pat. No. 4,369,361; U.S. Pat. No. 4,387,297; U.S. Pat. No. 4,409,470, U.S. Pat. No. 4,760,248 and U.S. Pat. No. 4,896,026, all of which have been assigned to the assignee of the present invention. These readers generally include a light source consisting of a gas laser or semiconductor laser for emitting a light beam. The use of semiconductor devices as the light source in readers is especially desirable because of their small size, low cost and low power requirements. The laser beam is optically modified, typically by a focusing optical assembly, to form a beam spot having a certain size at a predetermined target location. The cross-section of the beam spot at the target location may approximate the minimum width between symbol regions of different light reflectivity, i.e., the bars and spaces, but the spot cross-section can be larger and, in some cases, more than twice the minimum width.

In conventional readers, the light beam is directed by a scan component along a light path toward a target symbol. The reader operates by repetitively scanning the light beam in a scan pattern, for example, a line or a series of lines across the target symbol by movement of the scan component such as a mirror disposed in the path of the light beam. The scan component may sweep the beam spot across the symbol, trace a scan line across and beyond the boundaries of the symbol, and/or scan a predetermined field of view.

Readers also include a sensor or photodetector which functions to detect light reflected or scattered from the symbol. The photodetector or sensor is positioned in the reader in an optical path so that it has a field of view which extends at least across and slightly beyond the boundaries of the symbol. A portion of the light beam reflected from the symbol is detected and converted into an analog electrical signal. A digitizer digitizes the analog signal. The digitized signal from the digitizer is then decoded, based upon the specific symbology used for the symbol.

The scan pattern that scans the symbol can take a variety of forms, such as repeated line scan, standard raster scan, jittered raster scan, fishbone, petal, etc. These beam patterns are generated by controlled motions of the scan component in the beam path. Typically, the scan component is driven by some form of scanning motor to periodically deflect the beam through the desired beam scanning pattern. For a repeated line scan beam pattern, a polygonal mirror unidirectionally rotated by a simple motor can be utilized. For more complex beam patterns, more involved drive mechanisms are required.

The frequency at which the beam pattern is executed is also an important consideration. The more times a symbol can be scanned in a given time period, the chances of obtaining a valid read of the symbol are increased. This is particularly important when the symbols are borne by moving objects, such as packages traveling on a conveyor belt.

Symbols can also be read by employing imaging devices. For example, an image sensor device may be employed which has a two-dimensional array of cells or photosensors which correspond to image elements or pixels in a field of view of the device. Such an image sensor device may include a two-dimensional or area charge coupled device (CCD) or complementary metal oxide semiconductor (CMOS) device and associated circuits for producing electronic signals corresponding to a two-dimensional array of pixel information for a field of view.

It is therefore known to use a CCD for capturing a monochrome image of a barcode symbol to be read as, for example, disclosed in U.S. Pat. No. 5,703,349. It is also known to use a CCD with multiple buried channels for capturing a full color image of a target as, for example, disclosed in U.S. Pat. No. 4,613,895.

Many applications call for a hand-held reader in which the moving laser beam device or the imaging device is accommodated. For such applications, the arrangement of electro-optical components must be compact in order to be accommodated in a hand-held package which may be pistol-shaped. Moreover, such readers must be lightweight and structurally robust to withstand physical shock resulting from rough handling. It is also desirable that minimal power be consumed during operation to extend battery life.

It is further desirable that the symbol be capable of being read over an extended range of working distances relative to the hand-held reader. In the case of a moving laser beam device, it is conventional to move one or more lenses in the focusing optical assembly and, in turn, to move the focus of the laser beam between a near position close to the reader and a far position further away from the reader. The lens movement is typically performed mechanically. This is disadvantageous for several reasons. First, the mechanical movement generates vibrations which are propagated through the reader to the user's hand, and may also generate dust to obscure the optics. Moreover, depending on the scan rate, the vibrations can generate objectionable, annoying, audible hum. In addition, the lens movement requires a drive which, in turn, consumes electrical power, is expensive and slow, can be unreliable, occupies space and increases the overall weight, size and complexity of the reader.

It is generally known that a liquid crystal lens has been proposed to adjust the focus of an optical assembly. U.S. Pat. No. 5,305,731 describes a liquid lens with an adjustable focal length. U.S. Pat. No. 5,625,496 describes changing the index of refraction inside a liquid lens. French Publication No. 2,791,439 and No. 2,769,375 (and its equivalent, U.S. Pat. No. 6,369,954) describe a variable focus liquid lens.

SUMMARY OF THE INVENTION

Objects of the Invention

One object of this invention is to provide an improved arrangement for and method of adjusting the working range and/or beam spot size of a reader for reading a data-encoded symbol.

Another object of this invention is to provide an arrangement which is compact, lightweight, durable and efficient in construction and quiet and reliable in operation, and thus is ideally suited for portable hand-held applications.

Still another object of this invention is to adjust focal length in an electro-optical reader and/or change the beam spot cross-section without mechanically moving lenses.

FEATURES OF THE INVENTION

In keeping with these objects and others which will become apparent hereinafter, one feature of this invention resides, briefly stated, in an arrangement for, and a method of, electro-optically reading indicia, such as one- and/or two-dimensional bar code symbols.

The invention provides a pair of variable optical lenses, preferably each having a pair of light-transmissive liquids arranged along an optical path, the liquids of each lens being immiscible, of different optical indicies of refraction, and of substantially the same density. One of the liquids has a shape in a rest state for optically modifying light passing through the one liquid along the optical path toward the indicia to have a first optical characteristic. In accordance with this invention, a controller is operative for applying a voltage across the one liquid of each lens to change the shape thereof, and for optically modifying the light to have a second different optical characteristic.

In the case of a moving beam reader, a light source such as a laser diode emits the light as a laser beam, and the changing of the shape of the one liquid of a first one of the lenses focuses the laser beam at one of the working distances relative to the first variable lens along the optical path, and the changing of the shape of the one liquid of a second one of the lenses optically modifies the light to have a selected cross-section at the one working distance.

The controller applies a periodic voltage across the one liquid of each lens, either continuously during the reading, or only after determining that a particular indicium or bar code symbol has not been successfully read.

Each variable lens may include a single fixed lens, or a pair of fixed lenses at opposite ends thereof. The one liquid may be radially symmetrical with the optical path in the rest state, or in a modification, may extend along a transverse axis perpendicular to the optical path and modify the cross-section of the laser beam. An elliptical beam cross-section is preferred for reading one-dimensional symbols, whereas a circular beam cross-section is preferred for reading two-dimensional symbols. Changing the beam cross-section enables the reader to adaptively read damaged or poorly printed symbols.

An aperture stop in the optical path is operative for maintaining a constant beam cross-section as an input to the first variable lens.

The changing between different focal planes and/or the changing of the beam cross-section is performed without mechanically or physically moving solid lenses, thereby decreasing the noise and vibration and dust in such readers, as well as the size, weight, power and volume requirements. The variable liquid lens will not wear out over time.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a diagrammatic view of an arrangement using the variable lens of FIG. 2 for use in the reader of FIG. 1;

FIG. 4 is a diagrammatic view of an arrangement using the variable lens for use with an imaging reader;

FIG. 9 is a diagrammatic view using two variable lenses and an aperture stop for use in the reader of FIG. 1.

DETAILED DESCRIPTION OF THE PREFERRED EMBODIMENTS

Figure 1:
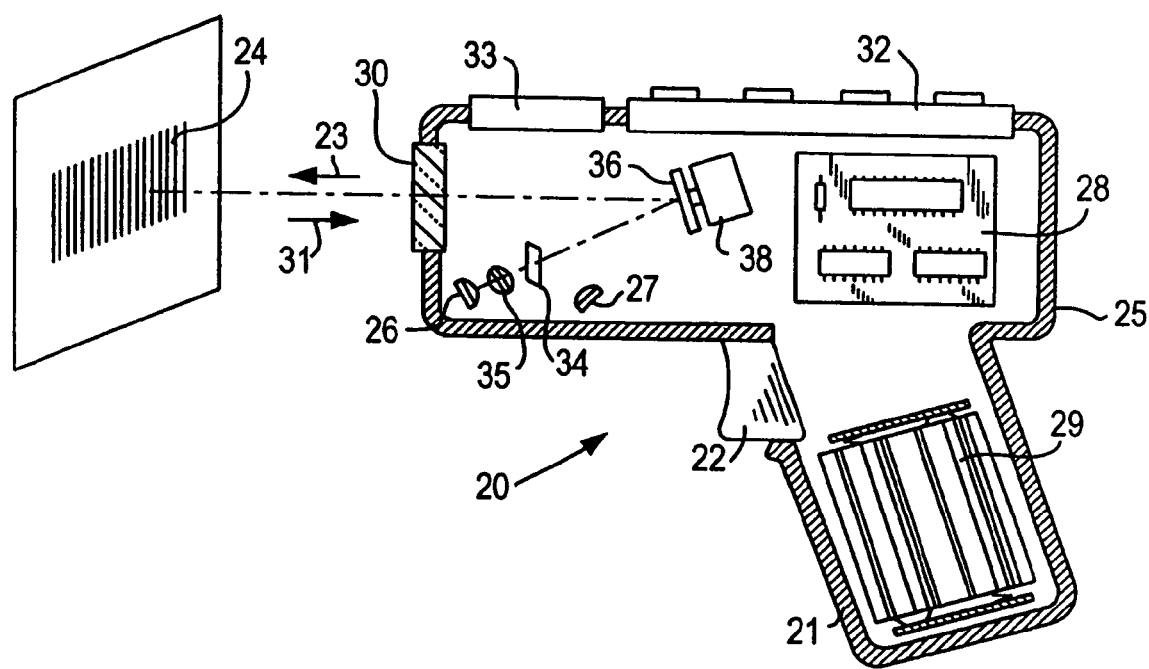
FIG. 1 is a schematic diagram of a hand-held reader for reading a bar code symbol in accordance with the prior art.

Reference numeral 20 in FIG. 1 generally identifies a hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by an optical focusing assembly 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected light 31 has a variable intensity over the scan pattern and passes through the window 30 onto the scan mirror 36 where it is reflected onto the splitter 34 and, in turn, reflected to the photodetector 27 for conversion to an analog electrical signal. As known in the art, the signal processing circuitry 28 digitizes and decodes the signal to extract the data encoded in the symbol.

Figure 2:
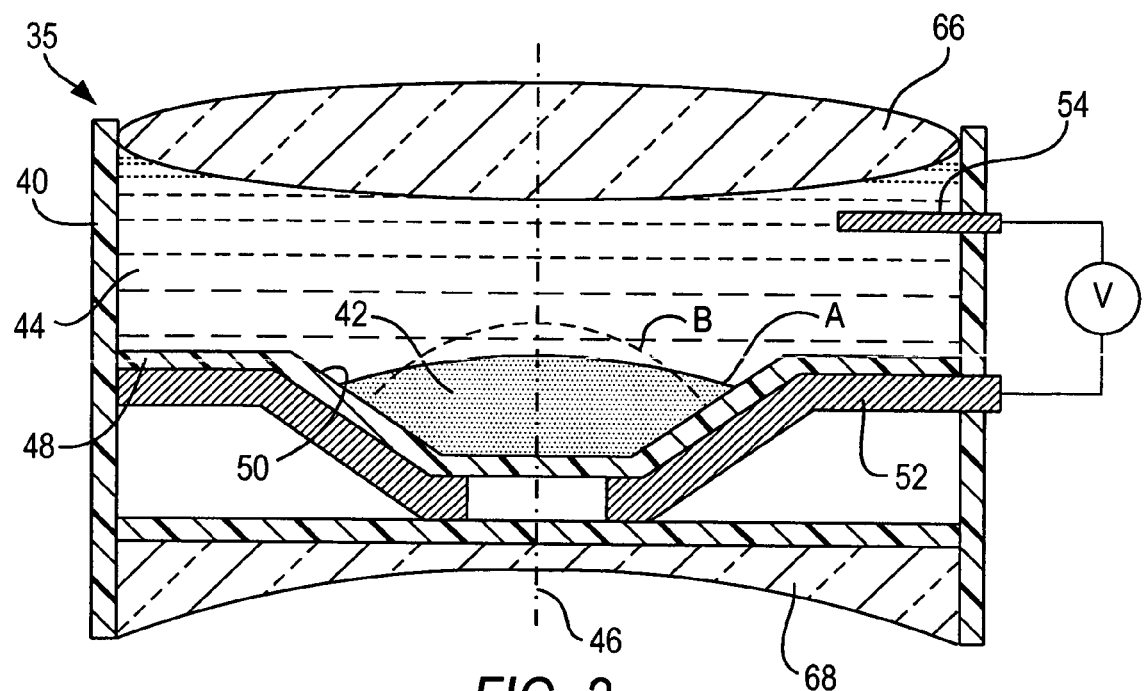
FIG. 2 is a cross-sectional view of a variable lens for use in the hand-held reader of FIG. 1.

In accordance with this invention, the focusing optical assembly 35 is configured as a variable lens as shown in FIG. 2. The variable lens has a housing 40 in which a first liquid 42, shown in droplet form, and a second liquid 44 are arranged along an optical path 46 which, as described below in connection with FIGS. 3-4, extends toward an indicia such as bar code symbol 24 to be read by an electro-optical reader 20.

The liquids 42, 44 are light-transmissive, immiscible, of different optical indicies of refraction and of substantially the same density. The liquid or drop 42 is constituted of an electrically insulating substance. For example, an oil, an alcane, or a blend of alcanes, preferably halogenated, or any other insulating liquid may be used for the drop 42. The liquid 44 is constituted of an electrically conductive substance, for example, water loaded with salts (mineral or other), or any other liquid, organic or not, and preferably made conductive by the addition of ionic components.

The housing 40 is constituted of an electrically insulating, light-transmissive, material, such as glass, preferably treated with silane or coated with a fluorinated polymer, or a laminate of fluorinated polymer, epoxy resin and polyethylene. The housing 40 includes a dielectric wall 48, preferably having a well 50 in which the drop 42 is accommodated in symmetrical relation relative to the optical path or axis 46. The wall 48 normally has a low wetting characteristic compared to the drop 42, but a surface treatment insures a high wetting characteristic and maintains a centered position of the drop 42 and prevents the drop from spreading. The well 50 further helps to prevent such spreading.

A first electrode 54 extends into the liquid 44, and a second electrode 52 is located below the wall 52. The electrodes are connected to a voltage source V. The electrodes, especially electrode 52, are preferably light-transmissive. As explained in U.S. Pat. No. 6,369,954, the entire contents of which are incorporated herein by reference thereto, when a voltage is applied across the electrodes, an electrical field is created which alters the wetting characteristic of the wall 48 with respect to the drop 42. The wetting increases substantially in the presence of an electrical field.

With no voltage applied, the drop 42 takes the generally hemispherical shape shown in solid lines in FIG. 2, and its outer surface "A" is convex. When a voltage is applied, the wetting of the dielectric wall 48 increases, and the drop 42 deforms and takes the shape shown in dashed lines in FIG. 2, and its outer surface "B" is more convex with a smaller radius of curvature. This deformation of the drop changes the focus of the lens 35 and is employed by the present invention to read the symbol 24 over an extended range of working distances, as described below in connection with FIGS. 3-4.

By way of example, the drop 42 in the rest state has a diameter of about 6 mm. If the liquid 44 is salt water, its index of refraction is about 1.35. If the drop 42 is oil, its index of refraction is about 1.45. About 40 diopters of focus variation can be achieved for an applied voltage of about 40v RMS. The response time of the lens is several hundredths of a second, in which case, if a periodic voltage is used, the frequency can be between 50 Hz and 10 kHz so that its period is smaller than the response time.

Turning to FIG. 3, the light source 26 of FIG. 1 is shown as a laser diode. The scan mirror 36 and its drive 38 are likewise depicted in FIG. 3. The change in curvature of the drop 42 in the variable lens 35 is responsible for varying the focal point between close-in position Z1 and far-out position Z2. The symbol 24 can be read at, and anywhere between, these end-limiting positions, thereby improving the working range of the reader.

The voltage is preferably periodic, preferably a square wave drive voltage. The square wave is easily created with a variable duty cycle by a microprocessor 60 having a built-in pulse width modulator circuit. The drive voltage could also be sinusoidal or a triangular wave signal, in which case, the amplitude of the voltage controls the shape of the drop 42 and, in turn, the focal length and the working distance. The square wave does not require a voltage as high as a sinusoidal wave for a given change in focal length. For example, many readers use a single 5 volt power supply. The variable lens requires much more than 5 volts and, hence, a higher voltage must be generated within the reader to drive the variable lens. The lower this generated voltage needs to be, the lower the cost of the voltage generation circuitry.

When a square wave is used, focal length changes are achieved by varying the duty cycle. When a sinusoidal wave is used, focal length changes are obtained by varying the drive voltage amplitude. The amplitude or the duty cycle can be changed in discrete steps (digital manner) or continuously (analog manner) by the micropressor or controller 60, preferably mounted on the same circuit board as the signal processing circuitry 28. The voltage could also be a constant DC voltage.

In the arrangement of FIG. 3, during reading, the laser beam is being scanned by the scan mirror 36 across focal planes generally transversely of the optical path or axis 46. The controller 60 may operate to apply the periodic voltage to the variable lens 35 at all times, or at selected times. Thus, the voltage can be applied for each scan, or for every other scan, etc. The voltage can be applied not only during scanning, but even afterward. The voltage can be initiated at the pull of the trigger 22, or only after a symbol has been detected. The voltage can be applied automatically, or only after a signal analyzer 62, preferably a microprocessor, has determined that the symbol being scanned has not yet been successfully decoded and read.

FIG. 4 is analogous to FIG. 3, except that it depicts an imager having a sensor 64, preferably a CCD or CMOS array having mutually orthogonal rows and columns of photocells for imaging the symbol located at, or anywhere between, the imaging planes Z3 and Z4, thereby providing the imager with an extended working range or depth of focus in which to collect light from the symbol. As before, the change in shape of the drop 42 when a periodic voltage is applied to the variable lens 35 enables the extended depth of focus to be achieved.

As described so far, the change in curvature of the drop 42 is between two convex curvatures A, B. It is also within the spirit of this invention to deform the drop between different curvatures. For example, it is possible that the outer surface of the drop could be a meniscus, that is concave in the rest state, generally flat to focus the light at a first focal plane when a first voltage is applied, and convex to focus the light at a second focal plane when a second, different voltage is applied.

Referring to FIG. 2, the variable lens 35 may also have a fixed convex lens 66 at one axial end region, and a fixed concave, or plano-concave, lens 68 at the opposite axial end region. These fixed lenses are part of the overall optical system and assist in minimizing any kind of aberrations, for example, chromatic aberrations. The optical system should advantageously include an aperture stop (not illustrated) which can be positioned anywhere in the optical path.

Figure 5:
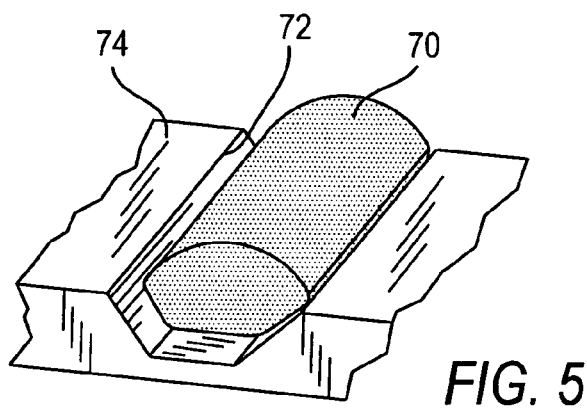
FIG. 5 is a broken-away view of a part of a variable lens in accordance with a modification.

In a variant, the drop 42 need not have a generally hemispherical shape, that is radially symmetrical relative to the optical path 46, but could, as shown in FIG. 5, be elongated along a transverse direction generally perpendicular to the optical path. The cylindrical drop, now identified by reference numeral 70, rests in a channel-shaped well 72 formed by a dielectric wall 74.

Figure 7:
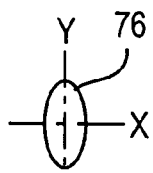

Upon application of a periodic voltage, the cylindrical drop 70, now acting as a cylindrical lens, changes the cross-section of the laser beam passing therethrough en route to the symbol. Thus, the beam cross-section 76 from a laser diode is generally elliptical as shown in FIG. 7. The illustrated x-axis is along the scan direction. The y-axis extends lengthwise of the bars and spaces of the symbol.

Figure 6:
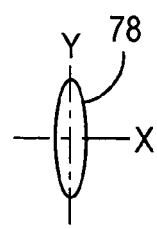
FIGS. 6, 7 and 8 are respective views of beam cross-sections produced by the variable lens of FIG. 5.
Figure 8:
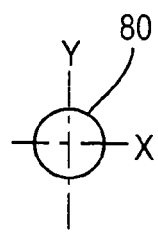

For one-dimensional symbols, a more elliptical or elongated beam cross-section 78, such as the one shown in FIG. 6, is desired. For two-dimensional symbols, a more circular beam cross-section 80, such as depicted in FIG. 8, is desired. By applying a periodic voltage, the cylindrical drop 70 can optically modify the cross-section of the beam to be either cross-section 78 or 80, or any shape in between. These shape changes can occur continuously or in stepwise manner and are especially useful in reading damaged or poorly printed symbols, thereby improving system performance.

It will be seen that the change in focus and/or the change in beam cross-section is accomplished without mechanical motion of any solid lenses. Except for the liquids, all parts of the variable lens 35 can be made of molded materials.

This invention proposes using more than one variable lens in the optical path. One variable lens can be used for focus variation, another can be used to change the ellipticity of the beam cross-section and/or the magnification (i.e., the zoom effect). Multiple lenses can also be used to reduce astigmatism similar to a Petzval lens.

More specifically, as shown in FIG. 9, two variable lenses are arranged in series along the optical path. An aperture stop 82 is advantageously positioned between the laser diode 26 and the first variable lens. The controller 60 has two outputs, one for each variable lens. Otherwise, the same reference numerals as were used above in connection with FIG. 3 have been used to identify like parts.

The aperture stop is operative to maintain a constant beam diameter as an input to the dual lens system of FIG. 9, or the single lens systems of FIG. 3 or 4, thereby assuring consistency with laser beam divergence variations.

As described above in connection with FIG. 3, varying the focal length will cause the beam spot or waist, i.e., the point where the laser beam has a minimum diameter in cross-section, to be moved between the different working range positions Z1 and Z2. When the focal length is varied, the size of the waist will change also. As the focal length is adjusted to move the waist outwards toward Z2, the waist increases in diameter, and when the waist is moved inwards toward Z1, the waist shrinks in diameter. As a result, resolution decreases as the waist is moved outwards, thereby resulting in a limitation in the capability of the reader to read high density symbols at far-out distances.

On the other hand, it is sometimes desirable to scan with a large sized waist at close-in distances, especially for reading damaged or low contrast symbols, because the large waist reduces speckle noise and reduces resolution making it easier for the reader to ignore printing defects.

The dual lens system of FIG. 9 enables the first variable lens to change the diameter of the waist where it is incident on the second variable lens. By controlling the waist diameter on the second lens, it is possible to maintain a constant waist size as the waist location is changed. The constant waist size can be large if desired for reading low density, damaged or low contrast symbols, or can be small for reading high density symbols over an extended range. The dual lens system can position any beam waist size at any working range distance as may be necessary for any scanning application.

The focal lengths of the two lenses can be controlled by the signal analyzer or microprocessor 62, either independently or simultaneously, in a coordinated manner to produce the desired waist size at the desired working distance. The waist size and/or working distance can be pre-set to optimize the reader for specific applications, or can be controlled by the microprocessor 62 running algorithms that analyze the return signal from the symbol and make adjustments as necessary to optimize the capability of the reader to read the symbol being scanned.

Advantageously, the same microprocessor used to decode the symbol is used as the signal analyzer. Moreover, the same microprocessor can be used to communicate the decoded data to a remote host computer via a hard-wired or wireless link, e.g., radio frequency or infrared.

Other types of variable lenses, other than the liquid lenses described herein, could also be employed.

This invention further contemplates using multiple electrodes in the variable lens to change the curvature of the drop 42 in different directions, thereby transforming a spherical lens to a cylindrical lens, for example. The minimum cross-section of the beam, also known as the beam waist, can be changed and, at the same time, the ellipticity of the beam can be changed. The use of additional (more than two) electrodes may be used to correct some specific aberration if needed, not only for a moving beam reader, but also for an imager.

In a moving beam scanner, not only can the variable lens be employed in the outgoing path toward the indicia to be read, but also the variable lens may be employed in the return path along which the reflected light returns to a photodetector. The variable lens may be positioned in front of the photodetector to control optical automatic gain by changing the amount of the reflected light impinging on the photodetector.

It will be understood that each of the elements described above, or two or more together, also may find a useful application in other types of constructions differing from the types described above.

While the invention has been illustrated and described as embodied in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for electro-optically reading indicia having parts of different light reflectivity, comprising:
   a) a plurality of variable focus optical lenses spaced apart along an optical path each lens having a pair of light-transmissive liquids arranged along the optical path, the liquids of each lens being immiscible, of different optical indicies of refraction, and of substantially same density, one of the liquids of each lens having a drop shape accommodated in a well in a rest state for optically modifying the light beam passing through said one liquid along the optical path toward the indicia to have a first optical characteristic;
   b) a light source for generating a light beam with a cross-section, and for directing the light beam along the optical path through the lenses toward the indicia located within a range of working distances away from the light source; and
   c) a controller for controlling one of lenses to focus the light beam at one of the working distances at which the indicia is located, and for controlling the other of the lenses to optically modify the light beam to have a selected cross-section at said one working distance, the controller being operative for applying a voltage across said one liquid of each lens to change the shape thereof, and for optically modifying the light beam to have a second different optical characteristic.

2. The arrangement of claim 1, and an aperture stop in the optical path between the light source and said one lens, for forming a constant beam cross-section for the light beam prior to passing through said one lens.

3. The arrangement of claim 1, wherein said one liquid is electrically insulating, and wherein the other of the liquids of each lens is electrically conductive, and wherein a first electrode is disposed at one side of said one liquid, and wherein a second electrode is immersed in said other liquid at an opposite side of said one liquid, and wherein the voltage is applied across the electrodes of each lens.

4. The arrangement of claim 1, wherein each variable lens includes at least one fixed focal lens spaced apart from the liquids along the optical path.

5. The arrangement of claim 4, wherein there are two fixed focal lenses having positive and negative optical powers respectively, and wherein the two fixed focal lenses are located at opposite ends of each variable lens.

6. The arrangement of claim 1, wherein the first and second optical characteristics of said one lens are different focal planes spaced apart along the optical path at different working distances relative to the light source.

7. The arrangement of claim 1, wherein the first and second optical characteristics of said other lens are different sizes of the cross-section of the light beam.

8. The arrangement of claim 1; and a scanner for scanning at least one of the light beam, and a field of view, over the indicia.

9. The arrangement of claim 8, wherein the controller is operative for continuously applying the voltage as a periodic voltage during scanning.

10. The arrangement of claim 8, wherein the controller is operative for determining whether the indicia was successfully scanned and read, and for applying the voltage upon a determination that the indicia was not successfully scanned and read.

11. The arrangement of claim 10, wherein the controller is a microprocessor operative for decoding an electrical signal derived from light reflected from the indicia.

12. The arrangement of claim 11, wherein the microprocessor is operative for communicating with a remote host.

13. An arrangement for electro-optically reading indicia having parts of different light reflectivity, comprising:
   a) a light source for directing a light beam along an optical path;
   b) an aperture stop for forming a constant cross-section for the light beam;
   c) a variable optical lens having a pair of light-transmissive liquids arranged along the optical path, the liquids being immiscible, of different optical indicies of refraction, and of substantially same density, one of the liquids having a drop shape accommodated in a well in a rest state for optically modifying the light beam of constant cross-section passing through said one liquid along the optical path toward the indicia to have a first optical characteristic; and
   d) a controller for applying a voltage across said one liquid to change the shape thereof, and for optically modifying the light beam to have a second different optical characteristic.

14. The arrangement of claim 13, wherein the first and second optical characteristics are different focal planes spaced apart along the optical path at different working distances relative to the variable lens.

15. A method of electro-optically reading indicia having parts of different light reflectivity, comprising the steps of:
   a) spacing a plurality of variable focus optical lenses apart along an optical path each lens having a pair of light-transmissive liquids arranged along the optical path, the liquids of each lens being immiscible, of different optical indicies of refraction, and of substantially same density, one of the liquids of each lens having a drop shape accommodated in a well in a rest state for optically modifying the light beam passing through said one liquid along the optical path toward the indicia to have a first optical characteristic;
   b) generating a light beam with a cross-section, and directing the light beam along the optical path through the lenses toward the indicia located within a range of working distances away from the lenses; and
   c) controlling one of lenses to focus the light beam at one of the working distances at which the indicia is located, and controlling the other of the lenses to optically modify the light beam to have a selected cross-section at said one working distance, by applying a voltage across said one liquid of each lens to change the shape thereof, and for optically modifying the light beam to have a second different optical characteristic.

16. The method of claim 15, and inserting an aperture stop in the optical path, for forming a constant beam cross-section for the light beam prior to passage through said one lens.

* * * * *